US007008084B2

(12) United States Patent
Galli

(10) Patent No.: US 7,008,084 B2
(45) Date of Patent: Mar. 7, 2006

(54) LIGHTING HEAD ASSEMBLY WITH INTEGRATED HEAT SINK

(76) Inventor: Robert D. Galli, 8176 Horseshoe Bend La., Las Vegas, NV (US) 89113

( * ) Notice: Subject to any disclaimer, the term of this patent is extended or adjusted under 35 U.S.C. 154(b) by 35 days.

(21) Appl. No.: 10/716,756

(22) Filed: Nov. 19, 2003

(65) Prior Publication Data

US 2004/0130892 A1 Jul. 8, 2004

Related U.S. Application Data

(60) Provisional application No. 60/437,810, filed on Jan. 3, 2003.

(51) Int. Cl.
*B60Q 1/06* (2006.01)
*F21V 29/00* (2006.01)

(52) U.S. Cl. ...................... 362/373; 362/800; 362/294; 362/208; 361/715; 361/719

(58) Field of Classification Search ................ 362/373, 362/147, 148, 145, 152, 153, 153.1, 800, 362/187, 203, 294, 205, 206, 208
See application file for complete search history.

(56) References Cited

U.S. PATENT DOCUMENTS

| | | | | |
|---|---|---|---|---|
| 1,990,504 A * | 2/1935 | Stimson | 362/205 |
| 6,160,355 A * | 12/2000 | Yee | 315/200 A |
| 6,168,288 B1 * | 1/2001 | St. Claire | 362/184 |

* cited by examiner

*Primary Examiner*—Sandra O'Shea
*Assistant Examiner*—Sharon Payne
(74) *Attorney, Agent, or Firm*—Barlow, Josephs & Holmes, Ltd.

(57) ABSTRACT

A novel lighting assembly that incorporates a high brightness light emitting diode (LED) in a compact assembly for further integration into a lighting device is provided. The lighting head assembly of the present invention provides several novel aspects that are all closely integrated to provide a unique assembly for incorporating a high brightness LED into a lighting device. In particular, the head assembly utilizes a receiver sleeve that includes a tail portion which surrounds the output end of the LED thereby isolating the LED and capturing both the conductive and radiant waste heat emitted by the LED to further dissipate the captured heat out of the assembly.

16 Claims, 5 Drawing Sheets

LIGHTING HEAD ASSEMBLY WITH INTEGRATED HEAT SINK

CROSS-REFERENCE TO RELATED APPLICATIONS

This application is related to and claims priority from earlier filed provisional patent application No. 60/437,810, filed Jan. 3, 2003.

BACKGROUND OF THE INVENTION

The present invention relates to a new lighting head assembly for use in lighting devices such as commercial and residential lighting fixtures, flashlights and miniature flashlights. More particularly, the present invention relates to compact and efficient lighting head assemblies for use with lighting devices of the type employing a high brightness light emitting diode (LED) to provide a smooth uniform spotlight beam having sharp edges.

Most commercially available lighting devices are designed to provide an on-axis, high intensity peak in their beam distribution as is typically found in flashlights with smooth reflectors or specialty architectural spotlights such as picture lights. In other words, most conventional lighting assemblies provide a central spot that is highly illuminated with a surrounding beam fall off region that varies from assembly to assembly. In general, these smooth reflector type assemblies simply re-image the light source into the far field of the device and create a poorly distributed, non-uniform illuminated field. Attempts to provide a more uniform beam distribution include the use of multi-faceted reflectors, however, the resulting beam pattern tends to be Gaussian with no sharp edge definition between the area illuminated by the beam and the surrounding non-illuminated area. In both the faceted and smooth reflector cases, the reflector generally tends to be parabolic in shape. While this shape reduces the direct re-imaging of the light source, this solution simply smears the image taken from the far field of the light source and projects that smeared image in the far field of the flashlight beam thereby still providing a non-uniform light image in the far field of the lighting device.

Other prior art attempts to produce a focused light source include the provision of a standard convex lens with a relatively long convergence factor in front of an LED package. These devices also produce an unacceptable result as they capture the far field image from a plane projected in front of the LED package and simply enlarge the LED image and then reflects that image in a reversed pattern in the flashlight beam far field. If the beam pattern is carefully studied, an image of the emitter die, diode and reflector cup can easily be identified in the beam image.

In most of the prior art assemblies, in order to provide even the marginally acceptable results using the assemblies described above, the lighting device needed a large reflector and a relatively large lens with a long focal length. These components dictated that the head of the light assembly have a large dimension as well. Further, because the LED lighting elements generate a great deal of heat, a heat dissipation path must be provided as well. In general, this heat dissipation path is simply provided in the form of creating a large volume of air space around the LED. All of these factors combined in the prior art to prevent the design of a compact lighting assembly that could incorporate a single high brightness LED.

Finally, in order to manufacture a portable lighting assembly that is compact it is desirable to provide a lighting assembly that can be operated using a single conventional battery such as a conventional AA or AAA cell battery. However, in order for this type battery to activate the LED, step up circuitry must be provided to increase the 1.5 volt battery output to at least the threshold voltage required to illuminate the LED. The drawback is that this circuitry is extremely sensitive to reversed polarity. Therefore there is also a need for providing reliable polarity protection thereby preventing a user from accidentally activating the lighting assembly with a battery that has been installed in reverse orientation.

Therefore, there is a need for a lighting device that produces a smooth, evenly distributed beam of light. In addition, there is a need for a lighting device that provides a high intensity beam of light that has a homogeneous illumination pattern. There is also a need for a high intensity flashlight beam that provides a uniform field of illumination and that has a sharp edge between the illuminated field and the non-illuminated field. There is a further need for a lighting head assembly that is compact and efficient in size while providing an integrated heat dissipation pathway. There is yet a further need for a compact lighting assembly that includes reliable and integrated polarity protection for the control circuitry therein.

BRIEF SUMMARY OF THE INVENTION

In this regard, the present invention provides a novel lighting assembly that incorporates a high brightness light emitting diode (LED) in a compact assembly for further integration into a lighting device. The lighting head assembly of the present invention provides several novel aspects that are all closely integrated in a single compact assembly to provide a solution to the drawbacks identified in the prior art. The lighting head assembly of the present invention is suitable for incorporation into any type of lighting device such as architectural lighting, accent lighting, task lighting and flashlights. The preferred embodiment shown and described in the disclosure of the present invention is designed for incorporation into a flashlight device. In this regard, the present invention will be described in the context of a flashlight assembly although the same concepts disclosed with respect to the preferred embodiment are also suitable for use in any type of lighting assembly.

The central element of the assembly of the present invention is a tubular receiver sleeve that is configured to receive the lighting element in a manner that supports and aligns the lighting element along an optical axis. The receiver serves both to contain and to channel the light from the LED and direct it forwardly along the optical axis. To aid in channeling of the light, the reciever includes a narrowed tail section that entirely surrounds the side portions of the optical element of the LED. By providing a narrowed tail element that surrounds the LED, the receiver also provides an efficient structure for capturing the heat generated by the LED element and directing that heat away from the LED.

In the preferred embodiment, the present invention utilizes a single high brightness lighting element such as an LED that is mounted onto a circuit board and placed into the tail of the receiver. When the LED is placed into the tail element of the receiver, the optical axis of the LED is automatically centered along the central axis of the receiver. In this manner the ability to further incorporate the assembly into lighting devices, such as flashlights, is greatly enhanced while providing the ability to utilize additional beam control elements in a precise and controlled manner. The end of the receiver opposite the tail element is configured to receive optical control elements such as a lens or an optical zoom assembly to capture the light output of the LED and project it into the far field of the device in a uniformly illuminated and carefully controlled beam.

An additional feature that is incorporated into the receiver to facilitate the compact nature of the present assembly is the provision of an electrically conductive pathway for connecting one terminal of the battery to the LED driver circuitry. By using the receiver to provide this conductive pathway, the need for additional connections or wire bonds between the driver circuitry for the LED and the housing is eliminated. In this manner, the assembly process is streamlined and the precision of the finished device is greatly improved.

In an effort to maintain the compact nature of the present invention, it is also desirable to drive the LED using a conventional single cell battery such as an AA or AAA type battery. As can be appreciated, this type battery is a 1.5 volt power source. Since typical LED's require 3.0 volts for operation, a step up circuit is provided in the LED driver circuitry. Step up circuits of this type are particularly sensitive and are susceptible to damage resulting from reversed polarity DC current. The present invention therefore also includes a novel construction for insuring that contact to the power source will only occur if the battery is installed in the proper orientation.

Accordingly, one of the objects of the present invention is the provision of a compact lighting assembly that includes a high intensity light source such as an LED. Another object of the present invention is the provision of a lighting assembly that utilizes a receiver sleeve to position an LED along the optical axis of the lighting device thereby offering improved light capture and transfer. A further object of the present invention is the provision of a lighting assembly that utilizes a receiver sleeve to both center the LED light source along the optical axis of the assembly and act as a heat sink to transfer the heat generated by the LED away from the LED and the driver circuitry. Yet a further object of the present invention is to provide a compact LED lighting assembly that utilizes a receiver to center the LED, act as a heat sink for the LED and to provide an electrically conductive path from one terminal of the battery to the LED driver circuitry. An even further object of the present invention is the provision of a compact lighting assembly that includes integrated voltage polarity protection for the LED driver circuitry.

Other objects, features and advantages of the invention shall become apparent as the description thereof proceeds when considered in connection with the accompanying illustrative drawings.

BRIEF DESCRIPTION OF THE DRAWINGS

In the drawings which illustrate the best mode presently contemplated for carrying out the present invention.

DETAILED DESCRIPTION OF THE INVENTION

Figure 1:
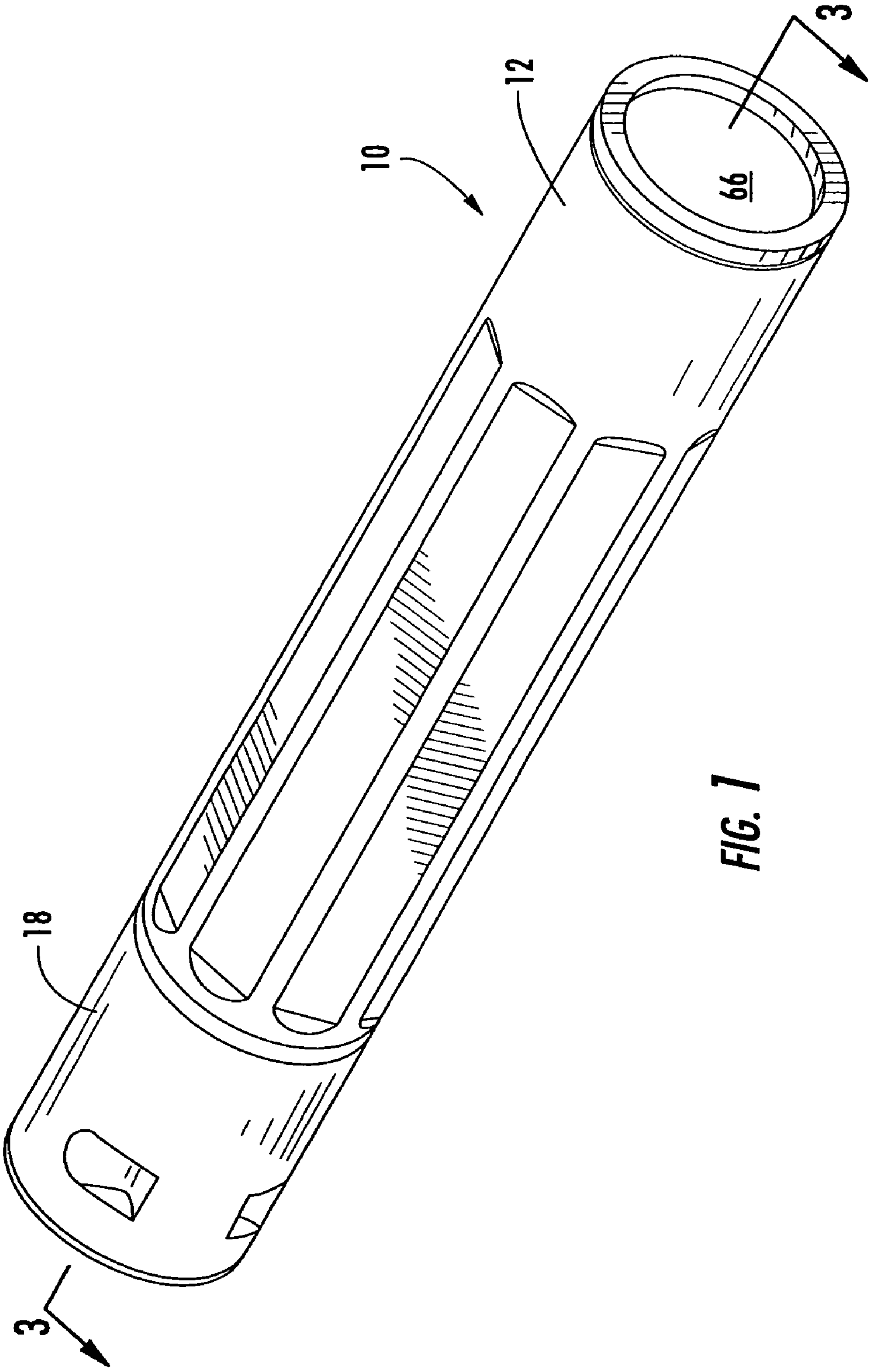
FIG. 1 is a perspective view of the preferred embodiment flashlight of the present invention.

Referring now to the drawings, the lighting head assembly of the present invention is shown and illustrated in the form of a compact flashlight that is generally illustrated and indicated at 10 in FIGS. 1–5. As stated above while the lighting head assembly is shown, for the purposes of the preferred embodiment, as being incorporated into a compact flashlight 10 assembly it can be appreciated by one skilled in the art that the present disclosure anticipated the lighting head being utilized in a variety of suitable assemblies. By way of example the head assembly of the present invention can be easily and efficiently incorporated into architectural lighting assemblies, general task lighting assemblies or automotive lighting assemblies and still remain within the spirit and scope of the present disclosure. As can be seen in FIG. 1 a flashlight 10 is shown that includes a tubular housing 12 with the lighting head assembly 14 of the present invention installed into one end thereof. The housing 12 is intended to receive the lighting head 14 at one end and to enclose a power source and a switch assembly to create a fully self contained lighting assembly such as a compact flashlight 10. As will be more fully described below, the tubular housing 12, in addition to enclosing the lighting head assembly 14, also encloses a power source and switch mechanism in the tail portion for selective activation of the lighting assembly.

Figure 2:
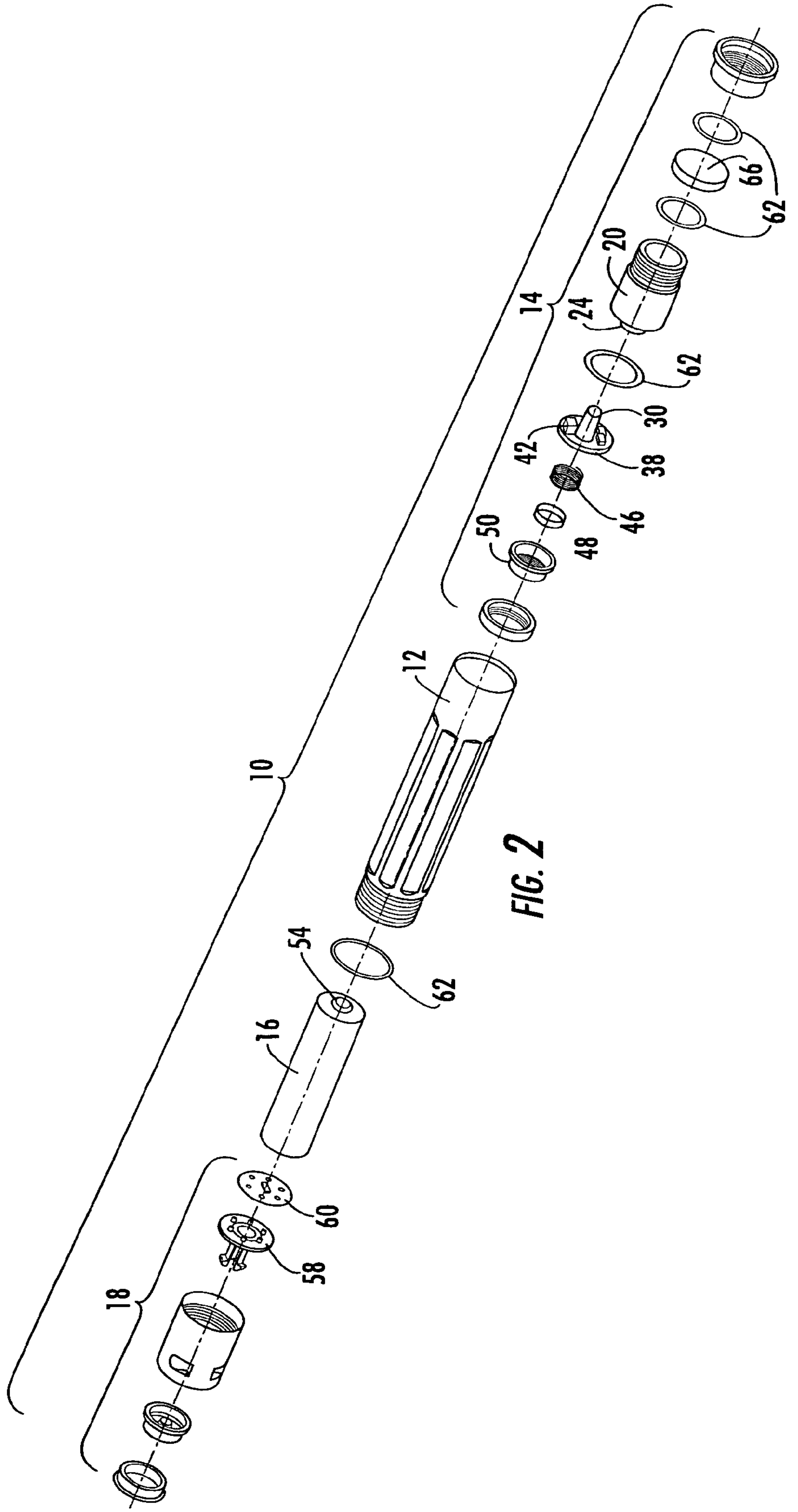
FIG. 2 is an exploded perspective view thereof.

Turning now to FIG. 2, an exploded perspective view showing all of the components of the flashlight 10 of the preferred embodiment is shown. The flashlight 10 generally includes three major sub-components, an outer housing 12 that encloses the power source 16, the lighting head assembly 14 that is installed into one end of the outer housing 12 and an end cap assembly 18 that also includes the mechanism for selectively activating the flashlight 10. In general terms, the flashlight 10 is shown to include a battery 16 that is installed into the outer housing 12 as the primary means for providing power to the lighting head assembly 14. It should be appreciated that in place of the battery 16, the lighting head assembly 14 could easily include a pair of electrically conductive leads (not shown) extending therefrom for connection to an alternate power source, such as a supply lead from a transformer or permanent building wiring. Further the end cap 18 assembly as will be more fully described below could be replaced with any type of switch as is known in the art.

Figure 3:
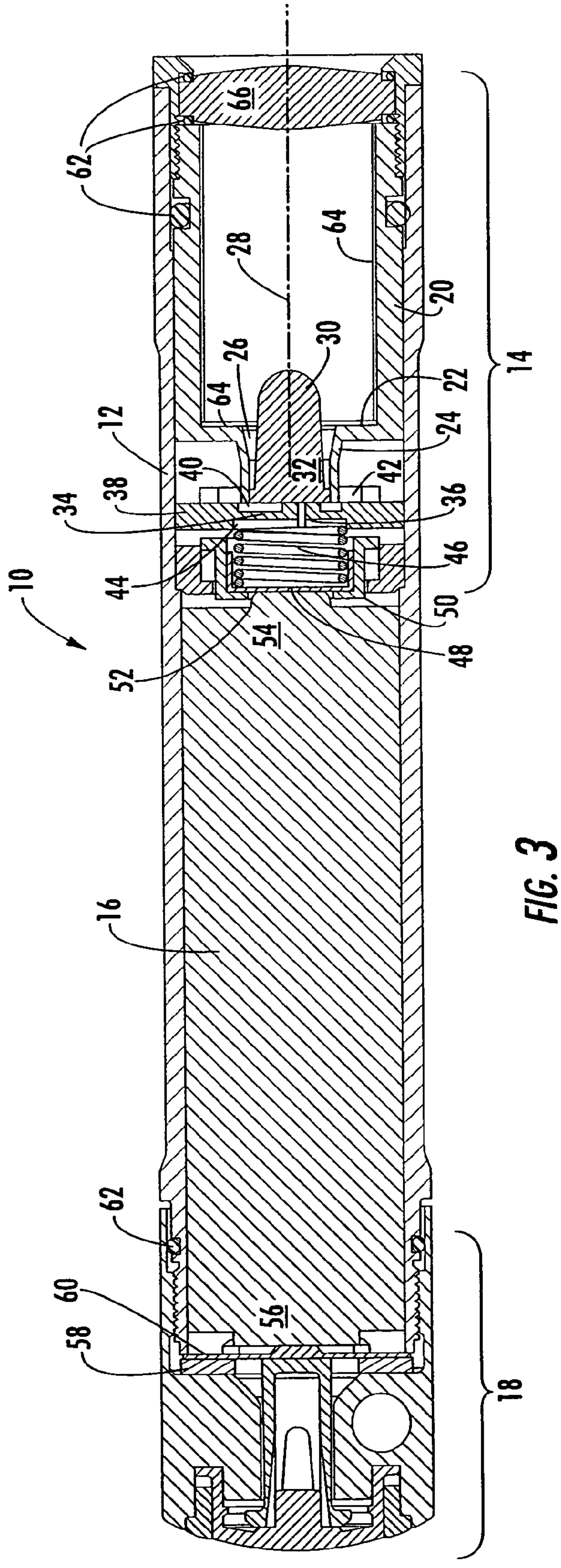
FIG. 3 is a cross-sectional view thereof as taken along line 3—3 of FIG. 1.

FIG. 3 is a cross-sectional view of the flashlight 10 fully assembled. By viewing FIGS. 2 and 3 in conjunction, it can be seen that the head assembly 14 is mounted into one end of the flashlight 10 housing 12. The head assembly 14 includes a receiver sleeve 20 with an optical element 66 at one end thereof and a lighting element 30 mounted onto a circuit board 38 received into the end of the receiver sleeve 20 at the end opposite the optical element 66. The central element of the head assembly 14 is the receiver sleeve 20. The receiver sleeve 20 is a tubular element with rear wall 22 and a tail section 24 extending therefrom. The rear wall 22 of the receiver sleeve 20 includes an aperture 26 at the point where the tail section 24 joins the receiver sleeve 20. The receiver sleeve 20 has a central axis 28 with the aperture 26 being formed to lie along the central axis 28.

The receiver sleeve 20 is preferably both electrically and thermally conductive. In the preferred embodiment, the receiver sleeve 20 is formed from brass or aluminum thereby making the sleeve 20 highly thermally and electrically conductive. Alternative materials such as filled conductive polymers or other metals may also be suitable for forming the receiver sleeve 20 provided that the material is sufficiently thermally and electrically conductive to maintain the functionality of the lighting head assembly 14.

The tail portion 24 of the receiver sleeve 20 has a diameter that is smaller than the overall diameter of the receiver sleeve 20. Further, the tail portion 24 has a diameter that slightly larger than the outer diameter of the lighting element 30. In this manner the lighting element 30 is received into the tail portion 24 and retained in a position that centers the lighting element 30 in the aperture 26 in the rear wall 22 of the receiver sleeve 20 and places the optical axis of the lighting element 30 into alignment with the central axis 28 of the receiver sleeve 20.

The lighting element 30 is preferably an LED although a conventional filament lamp or xenon lamp could also be used in the present invention. The LED 30 has an optical head portion 32 with two leads 34, 36 extending therefrom. The LED 30 is mounted onto a mounting board 38 wherein one of the contact leads 34 is in electrical communication with an electrical contact pad 40 formed on the top surface thereof. The electrical contact pad 40 is formed in concentric relation to the position where the lighting element 30 is mounted. As can be seen, when the lighting element 30 is received into the tail portion 24 of the receiver sleeve 20, the tail portion 24 is in contact with the contact pad 40 formed on the top surface of the mounting board 38. In this manner, an electrically conductive path is formed from the body of the receiver 20 through the tail piece 24, into the contact pad 40 on the mounting board 38 and directly to one of the contact leads 34 of the lighting element 30. This electrically conductive pathway facilitates electrical connection to the lighting element 30 on the mounting board 38 with out the need to include additional wire bonds or spring. Further, assembly steps where soldered connections need to be completed are eliminated. In this manner, the complexity of the assembly is greatly reduced while a more reliable and durable assembly is formed.

This direct conductivity pathway between the lead 34 of the lighting element 30 and the receiver sleeve 20 also serves the secondary purpose by providing a thermally conductive pathway to dissipate heat from the lighting element 30. As is well known in the art most of the heat generated by an LED device 30 is transmitted back through the contact leads 34, 36. In the present invention this heat is conducted down the lead 34, through the contact 40 on the mounting board 38 and transmitted into the receiver sleeve 20. Since the receiver 20 has a large thermal mass, it serves as a heat sink for absorbing and further dissipating the heat generated by the lighting element 30. Additionally, since the walls of the tail portion 24 of the receiver 20 are in close proximity to the optical portion 32 of the lighting element 30, heat that is radiated by the lighting element 30 is also absorbed by the walls of the tail portion 24 and further dissipated by the receiver sleeve 20. When the lighting head assembly 14 of the present invention is fully implemented by installing the assembly 14 into the housing 12, the outer wall of the receiver sleeve 20 is in electrical and thermal contact with the inner surface of the outer housing 12. In this manner, the housing 12 provides additional thermal mass for dissipation of the waste heat generated by the lighting element 30 while also extending the electrically conductive pathway for one contact of the power source 16 to be connected to the contact 40 on the top surface of the mounting board 38 and ultimately to the contact lead 34 of the lighting element 30.

The lighting head assembly 14 may also include driver and control circuitry 42 that is mounted onto the mounting board 38. Preferably, the control circuitry 42 is electrically connected between the second contact lead 36 of the lighting element 30 and a contact pad 44 formed on the bottom surface of the mounting board 38. The circuitry 42 is placed in contact with the second lead 36 and the bottom contact 44 so that it is not deposed along the thermal dissipation pathway that is provided between the lighting element 30 and the receiver sleeve 20. Further the circuitry 42 is located on the mounting board 38 in a position that is outside of the tail portion 24 of the receiver sleeve 20. In this manner, the circuitry 42 is shielded from damage that may result from being exposed to the heat generated by the lighting element 30.

A spring 46 is installed adjacent the bottom of the mounting board 38 and is in electrical communication with the contact pad 44 on the bottom surface thereof. The spring 46 provides an electrically conductive pathway to facilitate a connection with the second electrical contact of the power source 16. The spring 46 engages a metallic contact cap 48 that is formed within an outer nonconductive plunger 50. The plunger 50 includes an aperture 52 in the center of the bottom surface thereof. The aperture 52 is formed to have a dimension that allows the smaller contact end 54 of the power source 16 to pass through the aperture 52 and contact the contact cap 48 while preventing the larger contact end 56 of the power source 16 from reaching the contact cap 48 should the power source 16 be installed in reverse orientation. Specifically, the aperture 52 in the plunger 50 is sized to allow the smaller positive terminal 54 of an AA or AAA battery 16 to extend through the aperture 52 and contact the contact cap 48 while preventing the negative terminal 56 from reaching the contact cap 48. This polarity protection is necessary to protect the control circuitry 42 on the mounting board 38 from damage as a result of being exposed to reverse polarity. This is particularly necessary in applications where an LED lighting element 30 is used in conjunction with a single conventional cell battery 16 having a 1.5 volt supply voltage. Since the threshold voltage required for activation of an LED 30 is typically greater than the 1.5 volts available in an AA or AAA battery 16, the control circuitry 42 must include a step up circuit. Since step up circuits are highly sensitive to damage resulting from reverse polarity, a permanent means for protecting the lighting head assembly 14 from having reverse polarity applied is necessary. In this manner the plunger 50 arrangement provides the necessary protection while also facilitating electrical connectivity with the second contact 44 on the mounting board 38.

The spring 46, while providing spring force for the plunger 50 and contact cap 48 also urges the mounting board 38 forward against the end of the tail portion 24 of the receiver sleeve 20. In this manner, the spring 46 serves to maintain the mounting board 38 and the electrical contact 40 on the top surface thereof tightly against the tail portion 24. The forward pressure of the spring 46 is an important feature in the head assembly 14 because the mounting board 38 is formed to have a diameter that is smaller than the inner diameter of the outer housing 12. This allows the mounting board 38 to float slightly in a laterally un-restrained manner during assembly as the lighting element 30 is inserted into the tail section 24 and the head assembly 14 is installed into the end of the outer housing 12. When fully assembled, the slight degree of freedom of the mounting board 38 allows the lighting element 30 to be captured and centered in the aperture 26 of the receiver sleeve 20 and facilitates alignment of the entire assembly.

To complete the flashlight assembly 10, an end cap assembly 18 is provided to retain the battery 16 within the outer housing 12 and further provide a means for selectively activating the flashlight 10. The cap 18 includes an actuator 58 with a contact plate 60 on the inner surface thereof. The actuator 58 is depressed by the user causing the contact plate 60 to form an electrical connection between the negative terminal 56 of the battery 16 and the end of the outer housing 12 thereby completing the electrical circuit and energizing the lighting element 30. When the actuator 58 is released the spring 46 in the plunger 50 presses the battery 16, contact plate 60 and actuator 58 rearwardly opening the circuit. Additionally, the end cap 18 can be fully tightened to retain the contact plate 60 into the closed position providing a constant "on" function.

Finally, to create a waterproof assembly an assortment of gaskets and O-rings are also provided. As can be seen in FIG. 2, gaskets 62 are provided at the junction between the end cap 18 and the housing 12 as well as at the junction between the head assembly 14 and the housing 12.

Figure 4:
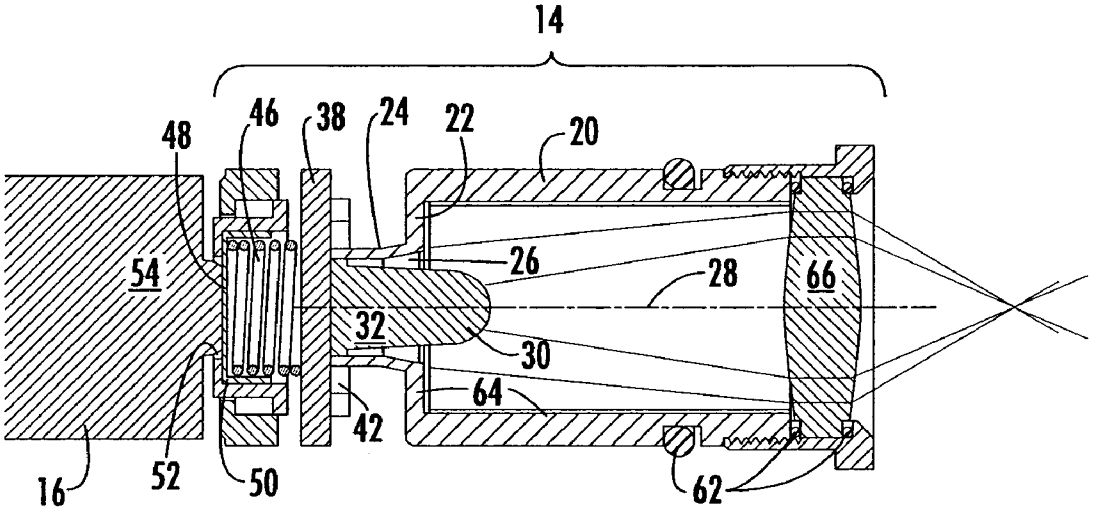
FIG. 4 is an enlarged cross-sectional view thereof including only the lighting head components.

Turning now to FIG. 4, another important and unique feature of the receiver sleeve 20 is illustrated. As was described above, the tail portion 24 of the receiver sleeve 20 captures the optical portion 32 of the lighting element 30 and centers it in the center of the aperture 26. In this manner, the optical axis of the lighting element 30 is centered along the central axis 28 of the receiver sleeve 20. The interior surfaces of the receiver sleeve 20 including the interior surface of the rear wall 22 and the interior wall of the tail portion 24 are all coated with a non reflective coating 64. Preferably, the interior surfaces are coated with a flat black non-reflective coating 64. When looking into the end of the receiver sleeve 20 with the lighting element 30 installed, it can be seen that a black non-reflective field is provided around the optical end 32 of the lighting element 30. Light emitted from the lighting element 30 fully illuminates the aperture 26 area while a dark non-illuminated shoulder can be seen at back wall 22 of the receiver sleeve 20 adjacent the aperture 26. This forms a high level of contrast between the illuminated aperture 26 and the non-illuminated back wall 22. The use of the coating 64 is counter intuitive to the prior art type devices. In the present invention it prevents stray light from being redirected onto the face of the rear wall 22 and maintains the high level of contrast between the aperture 26 and the face of the adjacent rear wall 22. An optical lens 66 is utilized to capture an undistorted image of the near field of the illuminated aperture 26. Further the lens 66 captures a sharp, high contrast image of the edge of the aperture 26 providing a sharp beam cutoff. This circular image is transferred by the lens 66 into the far field of the lighting device while the coating 64 serves to prevent the smearing effect seen in the shiny reflector elements of the prior art.

Figure 5:
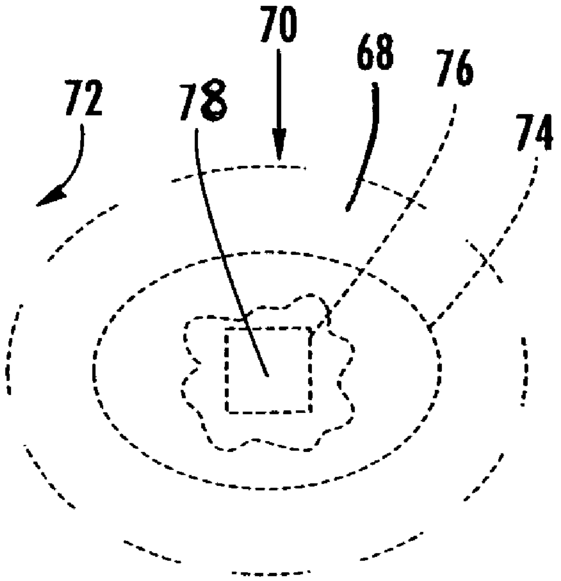
FIG. 5 (PRIOR ART)
FIG. 5 is a plan view showing the light beam pattern of a prior art lighting assembly.
Figure 5A:
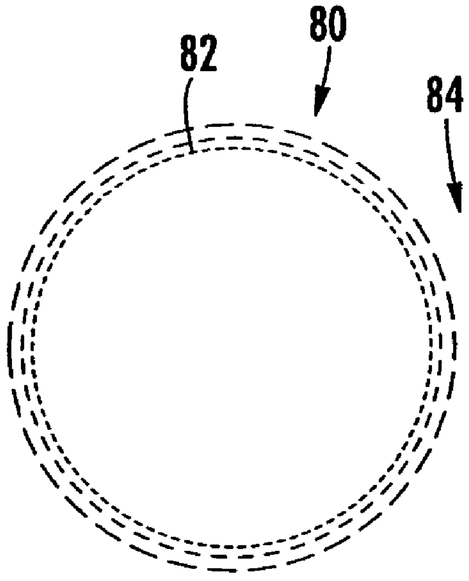
FIG. 5*a* is a plan view showing the light beam pattern of the present invention.

Turning to FIGS. 5 and 5*a*, images from a prior art conventional LED flashlight using a standard piano convex lens and a conventional reflector (FIG. 5) and from a lighting head assembly 14 of the present invention (FIG. 5*a*) are shown adjacent to one another for comparison purposes. The image in FIG. 5 can be seen to have poor definition in the transition zone 68 between the illuminated 70 and non-illuminated field 72 areas and an uneven intensity of light can be seen over the entire plane of the illuminated field 70. Areas of high intensity can be witnessed around the perimeter 74 of the illuminated field and in an annular ring 76 near the center of the field. In addition, a particularly high intensity area 78 of illumination can be seen in a square box at the center of the field and corresponds to the location of the emitter chip within the LED package 30. In contrast, FIG. 5*a* shows an image from the present invention. Note that the illuminated field 80 has a uniform pattern of illumination across the entire plane, the image captured across the illuminated aperture 26 and the edge 82 between the illuminated 82 and non-illuminated 84 fields is clear and well defined providing high levels of contrast created by the sharp cut off edge of the aperture 26 and the non-illuminated back wall 22 of the receiver 20.

It can therefore be seen that the present invention provides a novel and compact lighting head assembly 14 that provides a high quality illumination while being efficient and easy to assemble. The lighting head assembly 14 includes a novel receiver sleeve 20 that serves to remove waste heat from the device, facilitate electrical connections and control the light output. Further, the lighting head assembly 14 is compact and easily modified to allow its incorporation into a variety of different lighting devices to provide a well defined, highly controlled, high intensity beam output thereby creating a useful and novel assembly. For these reasons, the instant invention is believed to represent a significant advancement in the art, which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A lighting assembly comprising:

a circuit board having an upper surface and a lower surface;

a solid state lighting element having an output end and first and second contact leads extending therefrom, said lighting element mounted to said upper surface of said circuit board:

a first electrical contact formed on said upper surface of said circuit board concentric to said lighting element, said first electrical contact in thermal and electrical communication with said first contact lead of said lighting element;

a second electrical contact on said circuit board in electrical communication with said second contact lead of said lighting element; and a receiver sleeve having a tail section at one end thereof, said receiver sleeve being electrically and thermally conductive, said tail section being received around said output end of said lighting element, making electrical and thermal contact with said first electrical contact on said circuit board to provide both a thermally conductive path to dissipate heat from said lighting element and an electrically conductive path to said first electrical contact.

2. The lighting assembly of claim 1 wherein said lighting element is a light emitting diode.

3. The lighting assembly of claim 1, wherein said tail portion of said receiver sleeve surrounds said output end of said lighting element providing a thermal barrier to absorb radiant heat from said lighting element.

4. The lighting element of claim 1, said circuit board further comprising:

control circuitry mounted on tile upper surface thereof adjacent said lighting element, said control circuitry in electrical communication with said second contact lead of said lighting element and said second contact on said circuit board.

5. The lighting assembly of claim 4, wherein said tail portion of said receiver sleeve surrounds said output end of said lighting element providing a thermal barrier to absorb radiant heat from said lighting element and conduct said heat away from said control circuitry.

6. The lighting assembly of claim 1, said receiver sleeve further comprising:

a second end opposite said tail portion; and means for controlling the light output from the output end of said lighting element said means coupled to said second end of said receiver.

7. The lighting assembly of claim 6, further comprising:

a tubular housing, said housing being electrically and thermally conductive, said circuit board, lighting element and receiver sleeve received in one end thereof, said receiver sleeve in electrical and thermal communication with said tubular housing.

8. The lighting assembly of claim 1, further comprising:

a tubular housing, said housing being electrically and thermally conductive, said circuit board, lighting element and receiver sleeve received in one end thereof said receiver sleeve in electrical and thermal communication with said tubular housing.

9. A lighting assembly comprising:

a circuit board having an upper surface and a lower surface;

a solid state lighting element having an output end and first and second contact leads extending therefrom, said lighting element mounted to said upper surface of said circuit board;

a first electrical contact formed on said upper surface of said circuit board concentric to said lighting element, said first electrical contact in thermal and electrical communication with said first contact lead of said lighting element;

a second electrical contact on said circuit board in electrical communication with said second contact lead of said lighting element;

a receiver sleeve having a tail portion at one end thereof, said receiver sleeve being electrically and thermally conductive, said tail portion being received around said output end of said lighting element, making electrical and thermal contact with said first electrical contact on said circuit board to provide both a thermally conductive path to dissipate heat from said lighting element and an electrically conductive path to said first electrical contact;

a tubular housing, said housing being electrically and thermally conductive, said circuit board, lighting element and receiver sleeve received in one end thereof, said receiver sleeve in electrical and thermal communication with said tubular housing.

10. The lighting assembly of claim 9 wherein said lighting element is a light emitting diode.

11. The lighting assembly of claim 9, wherein said tail portion of said receiver sleeve surrounds said output end of said lighting element providing a thermal barrier to absorb radiant heat from said lighting element.

12. A lighting assembly comprising:

a circuit board having an upper surface and a lower surface;

a solid state lighting element having an output end and first and second contact leads extending therefrom, said lighting element mounted to said upper surface of said circuit board;

a first electrical contact formed on said upper surface of said circuit board adjacent said lighting element, said first electrical contact in electrical communication with said first contact lead of said lighting element;

a second electrical contact on said circuit board in electrical communication with said second contact lead of said lighting element;

a receiver sleeve having a first end a second end, a substantially planar end wall at said first end, an aperture in said end wall and a tail portion extending from said end wall concentric to said aperture, said receiver sleeve being thermally conductive, said tail portion being received around said output end of said lighting element, wherein said output end of said lighting element is substantially entirely on the exterior side of the plane of said end wall, to provide a thermally conductive path to dissipate heat from said lighting element; and a tubular housing, said housing being electrically and thermally conductive, said circuit board, lighting element and receiver sleeve received in one end thereof, said first electrical contact in electrical communication with said tubular housing and said receiver sleeve in thermal communication with said tubular housing.

13. The lighting assembly of claim 12, wherein said tail portion of said receiver sleeve surrounds said output end of said lighting element providing a thermal barrier to absorb radiant heat from said lighting element.

14. The lighting element of claim 12, said circuit board further comprising:

control circuitry mounted on the upper surface thereof adjacent said lighting element, said control circuitry in electrical communication with said second contact lead of said lighting element and said second contact on said circuit board.

15. The lighting assembly of claim 14, wherein said tail portion of said receiver sleeve surrounds said output end of said lighting element providing a thermal barrier to absorb radiant heat from said lighting element and conduct said heat away from said control circuitry.

16. The lighting assembly of claim 12, said receiver sleeve further comprising:

a second end opposite said tail portion; and means for controlling the light output from the output end of said lighting element, said means coupled to said second end of said receiver sleeve.

* * * * *